Nov. 24, 1953    J. RUSSELL ET AL    2,660,453
NONBENDABLE YIELDING SUPPORT FOR VEHICLE SPLASH-GUARDS
Filed Feb. 16, 1952
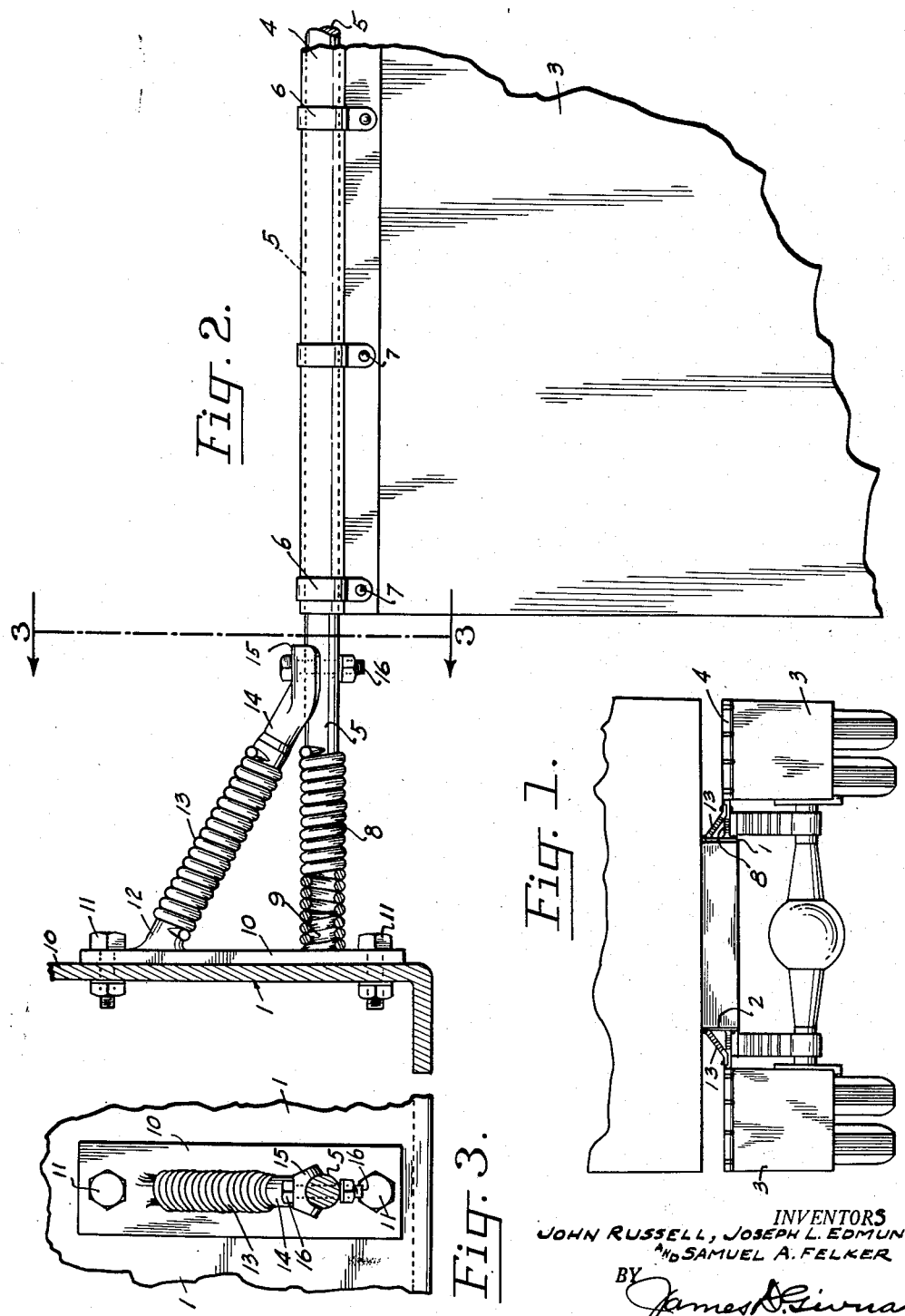
INVENTORS
JOHN RUSSELL, JOSEPH L. EDMUND,
AND SAMUEL A. FELKER
BY James D. Girvan
ATT'Y Patented Nov. 24, 1953

2,660,453

UNITED STATES PATENT OFFICE 2,660,453

NONBENDABLE YIELDING SUPPORT FOR VEHICLE SPLASH-GUARDS

John Russell, Joseph L. Edmund, and Samuel A. Felker, Portland, Oreg.

Application February 16, 1952, Serial No. 271,896

2 Claims. (Cl. 280—154.5)

This invention relates to improvements in splash-guards for the wheels of various kinds of vehicles and more particularly to the mountings for the splash-guards.

It is one of the principal objects of the invention to provide splash-guards which will be normally held in a vertical position and their supports in a horizontal position at right angles to the chassis of the vehicle under normal conditions but which will yield forwardly, rearwardly, upwardly, or downwardly upon impact with an obstruction instead of becoming bent or otherwise distorted or demolished as usually occurs when the apron supports are rigidly secured transversely of the vehicle.

A further object of the invention is the provision of splash-guard attachment means of this character which is of simple, efficient, rugged and inexpensive construction which may be readily adapted to vehicles of a wide variety of sizes and wherein their several parts are readily accessible for adjustment or replacement.

These and other objects will appear as our invention is more fully hereinafter described in the following specification, illustrated in the accompanying drawing and finally pointed out in the appended claims.

In the drawing:

Figure 1 is a rear elevation of a truck provided with a pair of splash aprons made in accordance with our invention.

Figure 2 is an enlarged fragmentary detail view of the splash apron and its mounting with fragments broken away for convenience of illustration.

Figure 3 is a sectional end elevation taken approximately along the line 3—3 of Figure 2.

Referring now more particularly to the drawing:

The chassis of the truck or vehicle includes the usual frame members indicated by reference numerals 1 and 2. To each frame member near the rear end thereof we secure a splash apron embodying our present invention and as both aprons and their supports are identical, a description of one will suffice for both. The apron indicated at 3 may be made of any suitable material such as leather, rubberized fabric, thick sheet rubber or the like, and may be secured to a supporting rod by any suitable means, such as, for instance, by turning the material over on itself at its upper end into tubular form as at 4 for attachment to a supporting rod 5. In this form of attachment the apron is secured to the rod by a plurality of clamps 6 whose cooperating ends are riveted or otherwise secured as at 7 to the apron 3.

The inner end of the supporting rod 5 is formed with right-hand threads for threaded engagement with one end of a coil spring 8 whose opposite end threadedly engages with a stud 9 formed with right-hand threads and secured to or formed integral with a supporting plate 10. Thus the rod 5 may be permanently but yieldingly secured to the plate 10 by merely advancing the coil spring 8 on the threaded end of the rod 5 and on the threaded stud 9. The supporting plate 10 is secured to the frame member by means of rivets or bolts as indicated at 11.

To serve as a diagonal brace for normally maintaining the apron-supporting rod 5 in a horizontal plane we provide an angularly disposed right-hand threaded stud 12 at the upper end of the plate 10 to threadedly engage one end of a companion coil spring 13 whose opposite end threadedly engages with a right-hand threaded end of an arm 14 whose opposite end is flared as at 15 into arcuate shape in end elevation to snugly fit the supporting rod 5 and to be secured thereto by welding or by a rivet or bolt as indicated at 16. The threaded end of the arm 14 and the threaded stud 12 are likewise yieldingly united by merely advancing the spring 13 on said threads. Also by advancing or retracting either or both of said springs on their respective threaded mountings the supporting rod 5 may be adjusted into a horizontal position in relation to the frame members of a vehicle which need not necessarily be in a vertical plane as shown in Figure 2.

By the foregoing arrangement the apron-supporting rod 5 will yield under pressure forwardly, rearwardly, upwardly, or downwardly upon collision of the truck or vehicle with an obstruction without damage to the supporting rod as heretofore when said supporting rod was made in a single piece throughout its length and rigidly secured intermediate its ends to the vehicle chassis.

While we have shown a particular form of embodiment of our invention we are aware that many minor changes therein will readily suggest themselves to others skilled in the art without departing from the spirit and scope of the invention. Having thus described our invention what we claim as new and desire to protect by Letters Patent is:

1. A splash-guard for a wheel or wheels of a vehicle including a chassis, the combination of a rod threaded at its inner end, a coil spring threadedly engaged with said threaded end of the rod, an externally threaded stud secured to said chassis and extending outwardly therefrom in a horizontal plane for threaded engagement with the opposite end of said spring to provide a resilient attachment of said rod to said chassis, an angularly disposed arm secured at one of its ends to said rod and threaded at its opposite end, an externally threaded stud secured to said chassis in angular relation thereto and in alignment with said arm, a coil spring threadedly engaged at one of its ends with said threaded end of said arm and at its opposite end with said threaded angularly disposed stud for cooperating with said first mentioned spring for maintaining said rod in a horizontal position.

2. A splash-guard for the wheels of a vehicle including a chassis, comprising in combination a horizontally disposed rod, a splash apron attached to and depending vertically from said rod, a horizontal coil spring secured at one of its ends to one end of said rod and at its opposite end to said chassis, an angularly disposed arm secured at one of its ends to said rod, an angularly disposed coil spring aligned in a vertical plane with said first mentioned spring and secured at one of its ends to one end of said arm and at its opposite end to said chassis for cooperating with said first mentioned spring for normally maintaining said rod in a horizontal position.

JOHN RUSSELL.
JOSEPH L. EDMUND.
SAMUEL A. FELKER.

References Cited in the file of this patent

UNITED STATES PATENTS

| Number | Name | Date |
|---|---|---|
| 492,394 | Eichberg | Feb. 28, 1893 |
| 1,947,525 | Hume | Feb. 20, 1934 |
| 2,141,844 | Reznor | Dec. 27, 1938 |
| 2,414,676 | Taurman et al. | Jan. 21, 1947 |
| 2,585,397 | McCollum | Feb. 12, 1952 |

FOREIGN PATENTS

| Number | Country | Date |
|---|---|---|
| 59,617 | Denmark | Mar. 30, 1942 |